(12) United States Patent
Wang et al.

(10) Patent No.: US 8,212,973 B2
(45) Date of Patent: Jul. 3, 2012

(54) COLOR FILTER SUBSTRATE AND LIQUID CRYSTAL DISPLAY

(75) Inventors: Wen-Chun Wang, Taichung (TW); Yung-Cheng Chang, Taichung County (TW); Ming-Chang Yu, Taichung (TW)

(73) Assignee: Wintek Corporation, Taichung (TW)

( * ) Notice: Subject to any disclaimer, the term of this patent is extended or adjusted under 35 U.S.C. 154(b) by 405 days.

(21) Appl. No.: 12/558,185

(22) Filed: Sep. 11, 2009

(65) Prior Publication Data
US 2010/0066954 A1 Mar. 18, 2010

(30) Foreign Application Priority Data

Sep. 15, 2008 (TW) ................. 97135303 A
Jun. 9, 2009 (TW) ................. 98119146 A

(51) Int. Cl.
*G02F 1/1335* (2006.01)
*G02F 1/1337* (2006.01)
*G02F 1/1343* (2006.01)
(52) U.S. Cl. .................. 349/106; 349/129; 349/139
(58) Field of Classification Search ............ None
See application file for complete search history.

(56) References Cited

U.S. PATENT DOCUMENTS

2005/0122441 A1 6/2005 Shimoshikiryoh
2006/0232729 A1* 10/2006 Rho ........................ 349/106
* cited by examiner

*Primary Examiner* — Wen-Ying P Chen
(74) *Attorney, Agent, or Firm* — Muncy, Geissler, Olds & Lowe, PLLC

(57) ABSTRACT

A liquid crystal display is provided which includes a color-filter substrate, an active matrix substrate, and a liquid crystal layer interposed between them. The active matrix substrate includes a first transparent substrate and includes a plurality of switching elements and a plurality of pixel electrodes formed on the first transparent substrate. Each switching element is electrically connected one of the pixel electrodes. The color-filter substrate defines a plurality of pixel areas. Each pixel area is suitable for corresponding to one of the pixel electrodes, includes a second transparent substrate, a first and second transparent conducting layers and a dielectric layer. The first transparent conducting layer is interposed between the second transparent substrate and the second transparent conducting layer, and the dielectric layer is interposed between the first and second transparent conducting layers. The second transparent conducting layer in each pixel area defines a hole.

16 Claims, 19 Drawing Sheets

COLOR FILTER SUBSTRATE AND LIQUID CRYSTAL DISPLAY

BACKGROUND OF THE INVENTION (a) Field of the Invention

The present invention relates to a color-filter substrate and a liquid crystal display, and more particularly, to a color-filter substrate and a liquid crystal display in which each pixel has two different transmittances.

(b) Description of the Related Art

FIG. 1 partially shows a schematic cross-section of a conventional liquid crystal display. Referring to FIG. 1, the liquid crystal display 90 includes a color filter substrate 912, an array substrate 914 and a liquid crystal layer 916. The color filter substrate 912 and the array substrate 914 are opposite each other. The liquid crystal layer 916 is interposed between the substrates 912 and 914, and has negative dielectric anisotropy so that the liquid crystal molecules are in a vertical alignment when a voltage is not applied thereto. Pixel electrodes 922 and switch devices (not shown) are formed on a transparent substrate 928 of the array substrate 914. The switch devices may be a thin-film transistor, or the like. In the color filter substrate 912, a color filter 930 are formed on a transparent substrate 926, and a common electrode 924 is formed on the color filter 930. The color filter 930 includes a black matrix layer 934 and filter traces 932.

When a user watches at a large viewing angle a conventional liquid crystal display having a vertical alignment structure, he may observe a color washout phenomenon in which the skin color tends to appear in pale blue or white. Appling technologies, such as dual gate line, dual data line (T-T type), common voltage swing, partial voltage of thin-film transistor or capacitance coupling (C-C type), to a pixel being divided into a plurality of areas may be solutions to reduce the color washout. Each of these approaches has drawbacks. For example, the technologies of dual data line and common voltage swing require additional ICs and components, which includes the manufacturing time and material cost. The technologies of partial voltage of thin-film transistor or capacitance coupling may reduce the color washout without using any additional ICs; however it reduces the aperture ratio due to the additional thin-film transistor. In addition, the technology of capacitance coupling forms self-coupled capacitance due to the floating electrodes, which causes serious image-sticking.

When a conventional liquid crystal display is touched by a finger of a user, the touch gets the liquid crystal molecules out of order, and causes fingerprint mura. In the conventional liquid crystal display, it takes a relatively long recovering time for the liquid crystal molecules to recover and turn to the direction of the electric field. Increasing the density of photo spacers or forming a patterned transparent electrode on the array substrate 914 may be a solution to the fingerprint mura. However, the former increases the manufacturing time and cost as a result of slowing down the speed of injecting the liquid crystal; the latter reduces the aperture ratio.

BRIEF SUMMARY OF THE INVENTION

One object of an embodiment of the present invention is to provide a color filter substrate and a liquid crystal display which may reduce color washout observed at a large viewing angle. One object of another embodiment of the present invention is to provide a color filter substrate and a liquid crystal display which may reduce fingerprint mura. One object of another embodiment of the present invention is to provide a color filter substrate and a liquid crystal display which may reduce color washout or fingerprint mura and furthermore whose aperture ratio is relatively large; manufacturing cost is relatively low.

According to an embodiment of the present invention, a liquid crystal display is provided. The liquid crystal display comprises an array substrate, a color filter substrate and a liquid crystal layer. The array substrate comprises a first transparent substrate, a plurality of switches and a plurality of pixel electrodes. The switches and the pixel electrodes are disposed on the first transparent substrate and each switch is electrically coupled to one of the pixel electrodes. The liquid crystal layer disposed between the array substrate and the color filter substrate. The color filter substrate defines a plurality of pixel areas; each pixel area positionally corresponds to one of the pixel electrodes. Furthermore, the color filter substrate comprises a second transparent substrate, a first transparent conductive layer, a second transparent conductive layer and a dielectric layer. The first transparent conductive layer is disposed between the second transparent substrate and the second transparent conductive layer. The dielectric layer is disposed between the first transparent conductive layer and the second transparent conductive layer. The second transparent conductive layer defines at least one hole in each pixel area.

According to another embodiment of the present invention, a color filter substrate is provided. The color filter substrate defines a plurality of pixel areas; each pixel area positionally corresponds to one of the pixel electrodes in an array substrate. Furthermore, the color filter substrate comprises a transparent substrate, a first transparent conductive layer, a second transparent conductive layer and a dielectric layer. The first transparent conductive layer is disposed between the transparent substrate and the second transparent conductive layer. The dielectric layer is disposed between the first transparent conductive layer and the second transparent conductive layer. The second transparent conductive layer defines at least one hole in each pixel area.

According another embodiment of the present invention, the dielectric layer in the above color filter substrate and liquid crystal display may be a color filter. It is preferred that the first transparent conductive layer is disposed between the second transparent substrate (or transparent substrate) and the color filter. According another embodiment, the dielectric layer may be a transparent layer and the color filter substrate further comprises a color filter. It is preferred that the color filter is disposed between the first transparent conductive layer and the second transparent substrate (or transparent substrate). The color filter may comprise a black matrix layer and a plurality of filter traces defined by the black matrix layer, and each filter trace positionally corresponds to one of the pixel areas.

According another embodiment of the present invention, the color filter substrate further comprises a non-display area defining a via hole, and therefore the first transparent conductive layer is electrically coupled to the second through the via hole. It is preferred that the non-display area is disposed in the periphery of the color filter substrate and surrounds the pixel areas.

According an embodiment of the present invention, at least two areas, in which liquid crystal molecules of the liquid crystal layer are orientated to different directions, is generated between the pixel area and the pixel electrode in the above color filter substrate and the liquid crystal display.

Other purposes and benefits of the invention can be further understood by the technical features disclosed in the above-mentioned embodiments. In order to provide better and more obvious understanding of the purposes, features, and benefits of the invention, the detailed descriptions of the embodiments according to the invention will be given in the following together with figures.

DETAILED DESCRIPTION OF THE INVENTION

As used herein, it will be understood that when an element is referred to as being "formed" or "disposed" on another element, it can be directly formed or disposed on the other element or intervening elements may be present.

Figure 1:
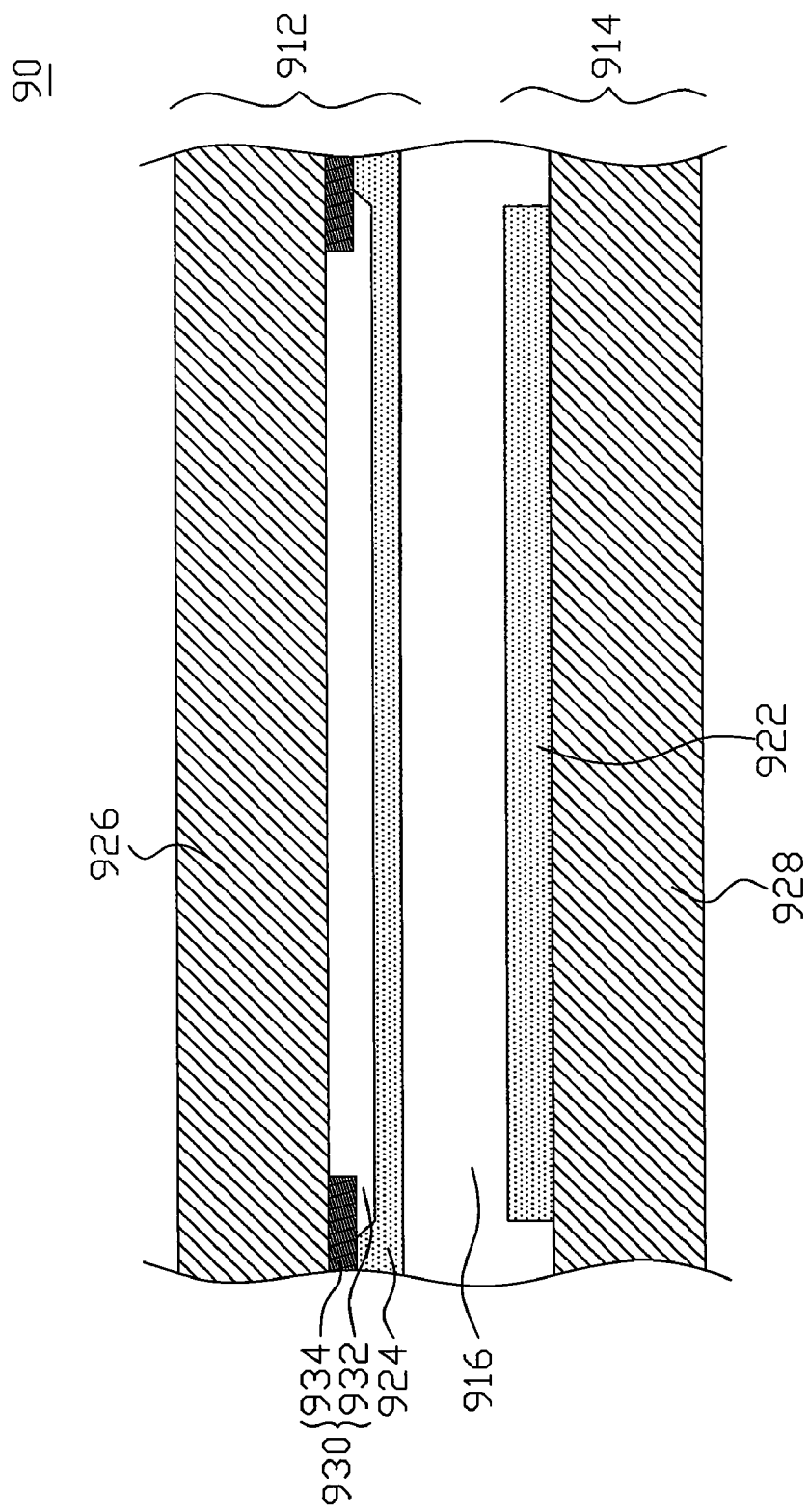
FIG. 1 partially shows a schematic cross-section of a conventional liquid crystal display.
Figure 2:
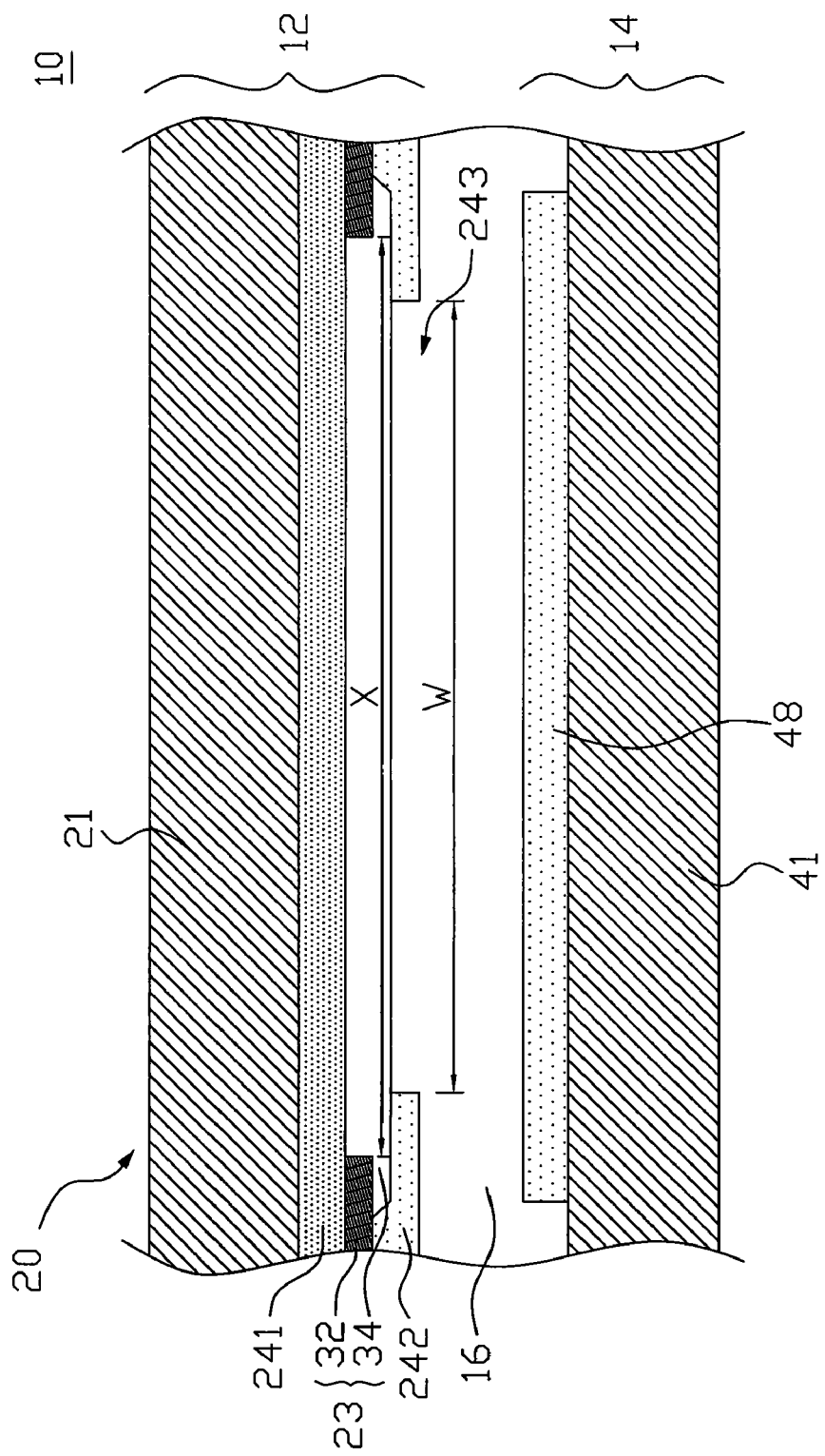
FIG. 2 partially shows a schematic cross-section of a liquid crystal display according to an embodiment of the present invention.

FIG. 2 partially shows a schematic cross-section of a liquid crystal display according to an embodiment of the present invention. Referring to FIG. 2, the liquid crystal display 10 includes a color filter substrate 12, an array substrate 14 and a liquid crystal layer 16. The color filter substrate 12 and the array substrate 14 are opposite each other. The liquid crystal layer 16 is interposed between the substrates 12 and 14, and has negative dielectric anisotropy so that the liquid crystal molecules are in a vertical alignment when a voltage is not applied thereto. Chiral dopant may be added into the liquid crystal layer 16 to speed up the rotational motion of the liquid crystal molecules and reduce the disclination.

Figure 3:
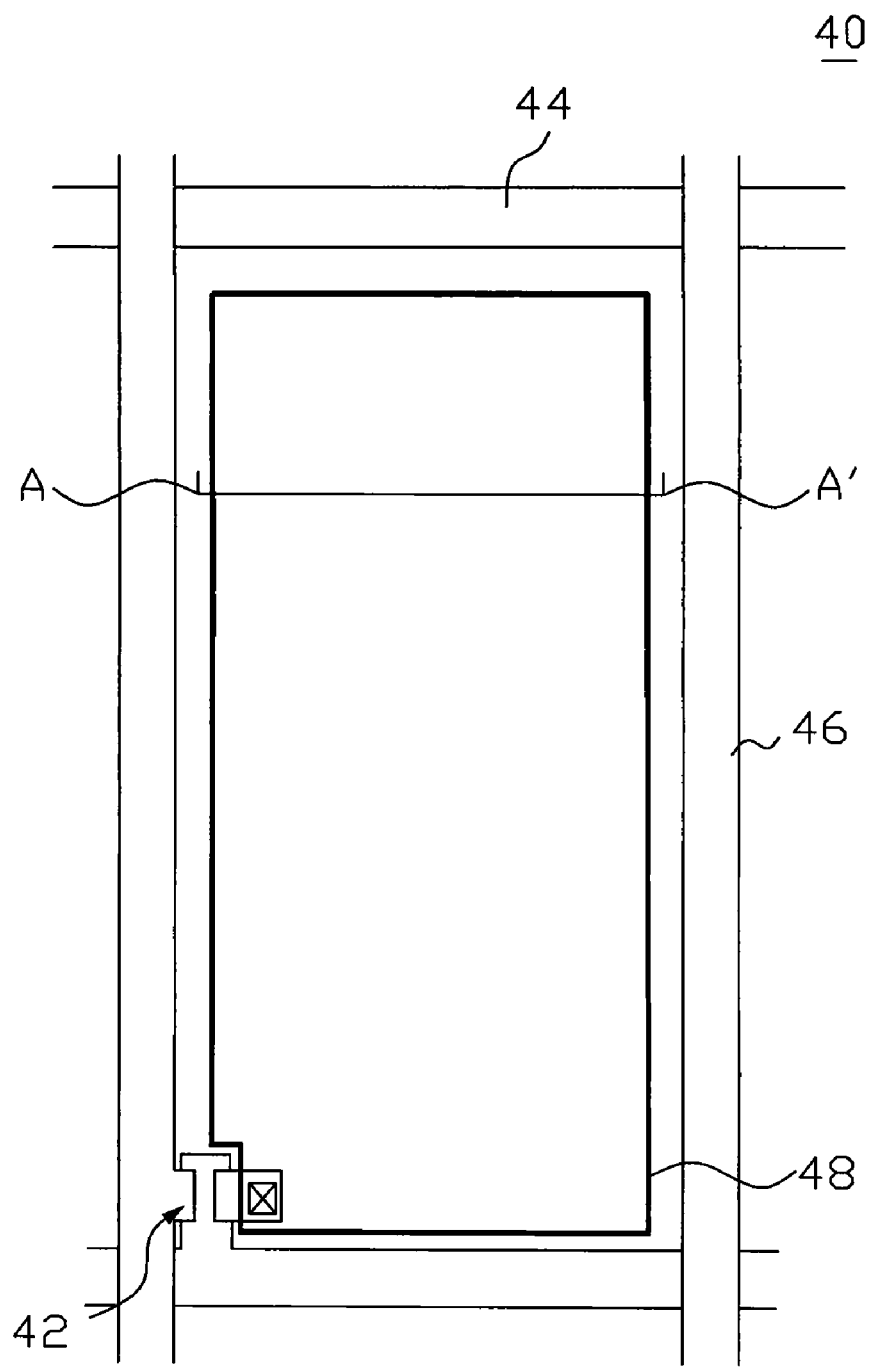
FIG. 3 shows a top view of a pixel structure on the array substrate of a liquid crystal display according to an embodiment of the present invention.

FIG. 3 shows a top view of a pixel structure on the array substrate of a liquid crystal display according to an embodiment of the present invention. In this embodiment, the switch may be an n-type a-Si TFT 42. Referring to FIGS. 2 and 3, a plurality of parallel scan lines 44 and a plurality of parallel data lines 46 are formed on a first transparent substrate 41 of the array substrate 14. Two adjacent scan lines 44 and two adjacent data lines 46 perpendicular to the two adjacent scan lines 44 define a pixel area 40. A pixel electrode 48 is disposed in the pixel area 40, and a TFT 42 coupled to the pixel electrode 48 is disposed adjacent to the crossing of a scan line 44 and a data line 46. The pixel electrode 48 may be made of a transparent conductive layer, such as indium tin oxide (ITO) or indium zinc oxide (IZO).

Figure 4:
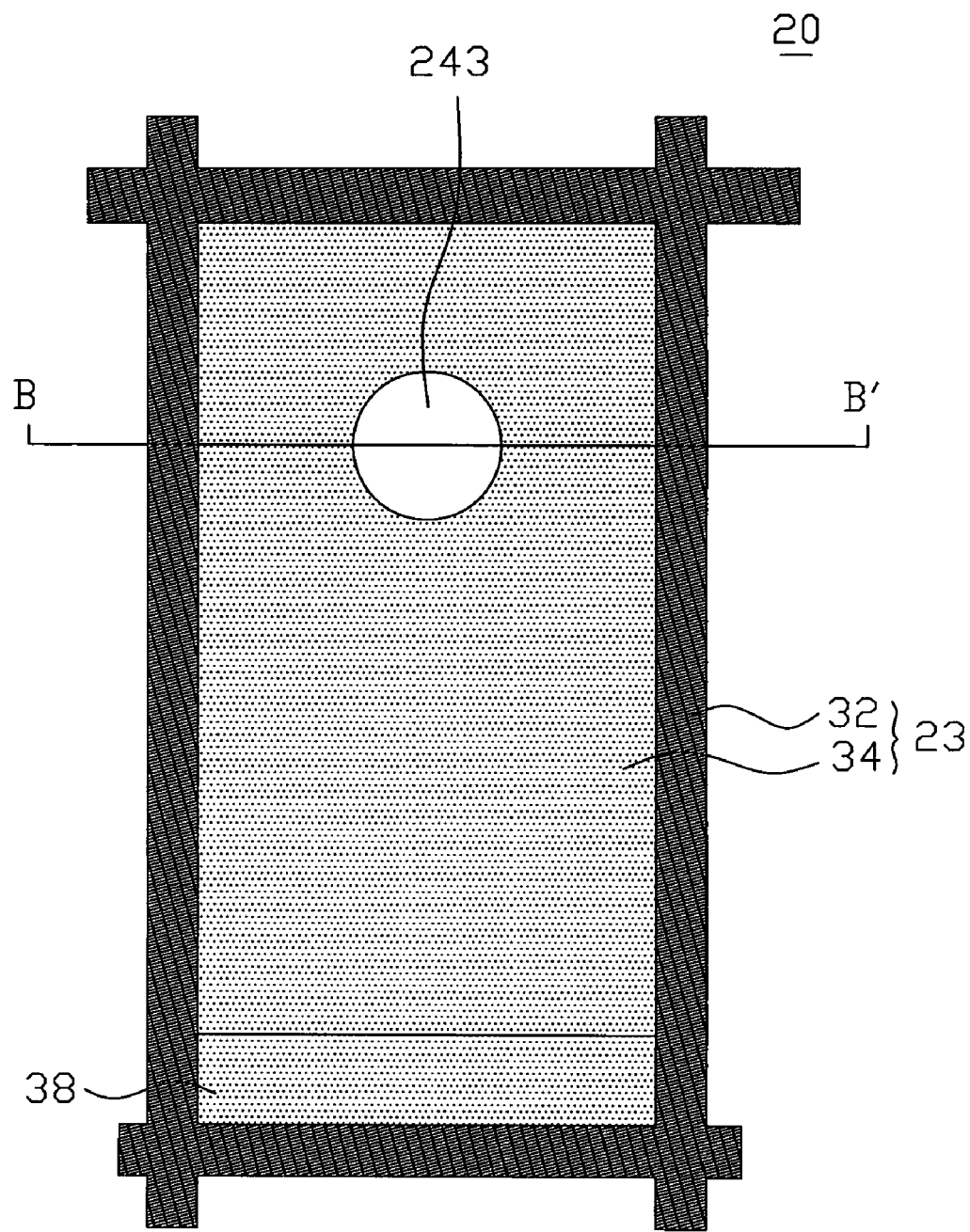
FIG. 4 shows a top view of a pixel area on the color filter substrate of a liquid crystal display according to an embodiment of the present invention.

FIG. 4 shows a top view of a pixel area on the color filter substrate of a liquid crystal display according to an embodiment of the present invention. Referring to FIGS. 2 and 4, the color filter substrate 12 defines a plurality of pixel areas 20. Each pixel area 20 positionally corresponds to one of the pixel electrodes 48 on the array substrate 14. In the color filter substrate 12, a color filter 23 is formed on a second transparent substrate 21. The color filter 23 includes a black matrix layer 32 and a plurality of filter traces 34 defined by the black matrix layer 32. Each filter trace 34 positionally corresponds to one of the pixel areas 20. The filter trace 34 includes an area 38 which positionally corresponds to the TFT 42 on the array substrate 14 when the color filter substrate 12 and the array substrate 14 are assembled into the liquid crystal display 10. Each filter trace 34 may be made of materials having different color so that the filter traces 34 may have red filter traces, green filter traces and blue filter traces, for example. The black matrix layer 32 is disposed between two filter traces 34 for shielding light. In this embodiment, the first and second transparent substrates 41 and 21 may be a glass substrate, a plastics substrate or plastics flexible sheet.

Specifically, the schematic cross-section of the array substrate 14 in FIG. 2 is the cross-section along the line A-A' in FIG. 3, and the schematic cross-section of the color filter substrate 12 in FIG. 2 is the cross-section along the line B-B' in FIG. 4. The color filter substrate 12 defines a plurality of pixel areas 20, and each pixel area 20 positionally corresponds to one of the pixel electrode 48. As shown in FIG. 2, the color filter substrate 12 comprises a second transparent substrate 21, a first transparent conductive layer 241, a second transparent conductive layer 242 and a color filter 23 being a dielectric layer. The first transparent conductive layer 241 is disposed between the second transparent substrate 21 and the second transparent conductive layer 242, and the color filter 23 is disposed between the first transparent conductive layer 241 and the second transparent conductive layer 242. A filter trace 34 of the color filter 23 positionally corresponds to a pixel area 20. In a preferred embodiment, the first transparent conductive layer 241 is formed on the second transparent substrate 21. The color filter 23 is formed on the first transparent conductive layer 241. The second transparent conductive layer 242 is formed on the color filter 23.

In this embodiment, the color filter 23 being a dielectric layer is disposed between the first transparent conductive layer 241 and the second transparent conductive layer 242 so that a capacitor is formed between the first transparent conductive layer 241 and the second transparent conductive layer 242. In addition, the second transparent conductive layer 242 further defines at least one hole 243. The pixel area 20 and the pixel electrode 48 can be divided into two areas: a first area positionally corresponding to the hole 243 and a second area positionally corresponding to the pixel area 20 without the hole 243. Since the first area and second area respectively have different capacitances, the electric fields between the pixel electrode 48 and the first and second areas of the pixel area 20 are different so that the liquid crystal molecules of the liquid crystal layer 16 in the two areas are orientated to different directions. The two areas may have different transmittances due to the different directions of the liquid crystal molecules. Accordingly, the color washout may be reduced. In addition, when the liquid crystal display is touched by a finger of a user, a fingerprint mura occurs due to the liquid crystal molecules being out of order. Since the pixel area 20 may form two different electric fields, it is easy for the liquid crystal molecules to return their original direction so that the fingerprint mura is reduced.

The shape of the hole 243 is not limited which may be a circle, a rectangle, narrow strips, or irregular shape. The location of the hole 243 is also not limited. Although the hole 243 in FIG. 4 is disposed in the upper portion of the pixel area 20, the hole 243 may be disposed in the lower portion or middle portion of the pixel area 20. The number of the holes 243 is also not limited. The pixel area 20 may define a plurality of holes 243 located in different portions of the pixel area 20. The pixel area 20 may be formed as one area or be divided into an upper portion and a lower portion, as shown in FIG. 5.

Figure 5:
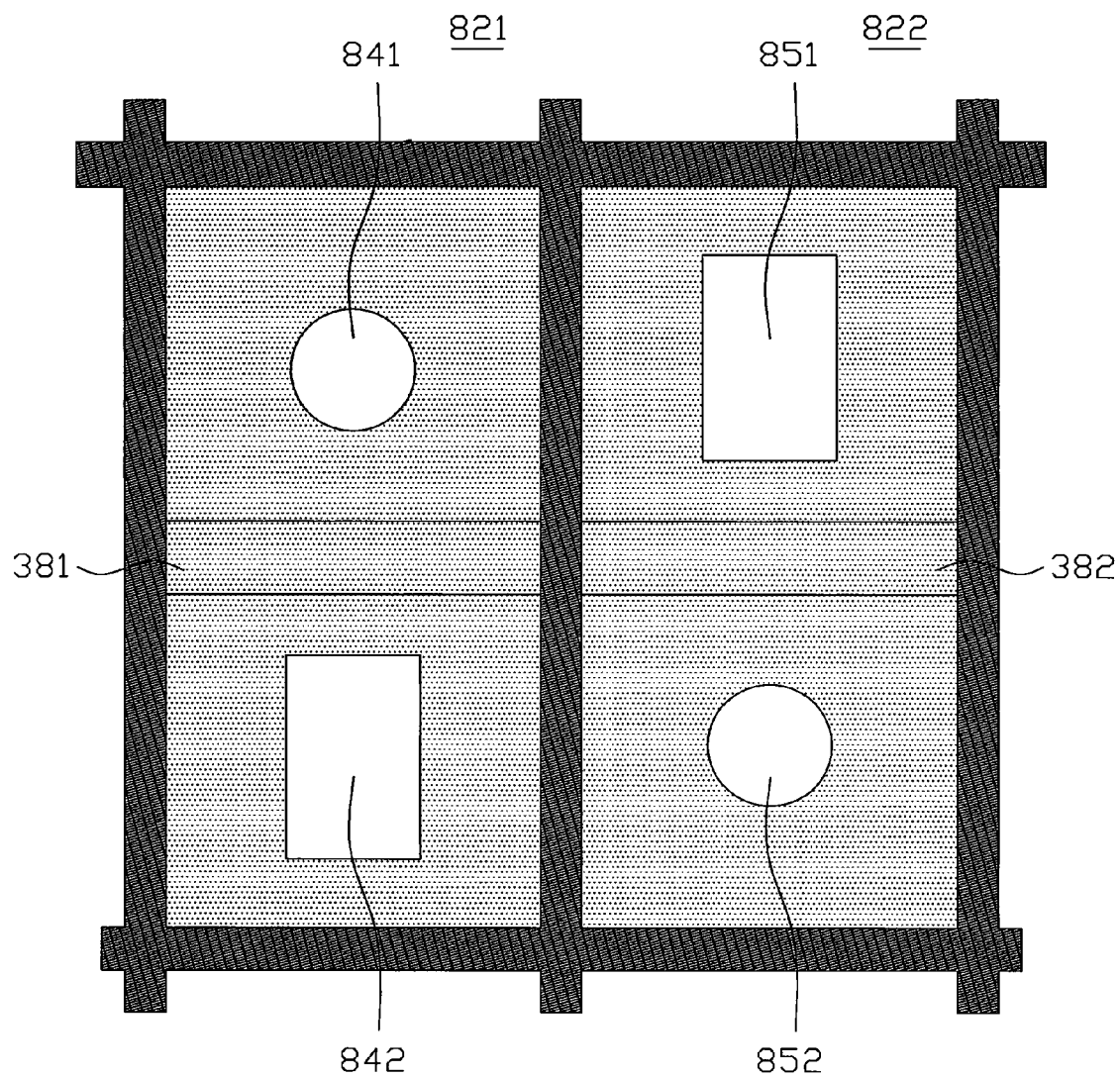
FIG. 5 shows a top view of two adjacent pixel areas on the color filter substrate of a liquid crystal display according to an embodiment of the present invention.
Figure 6:
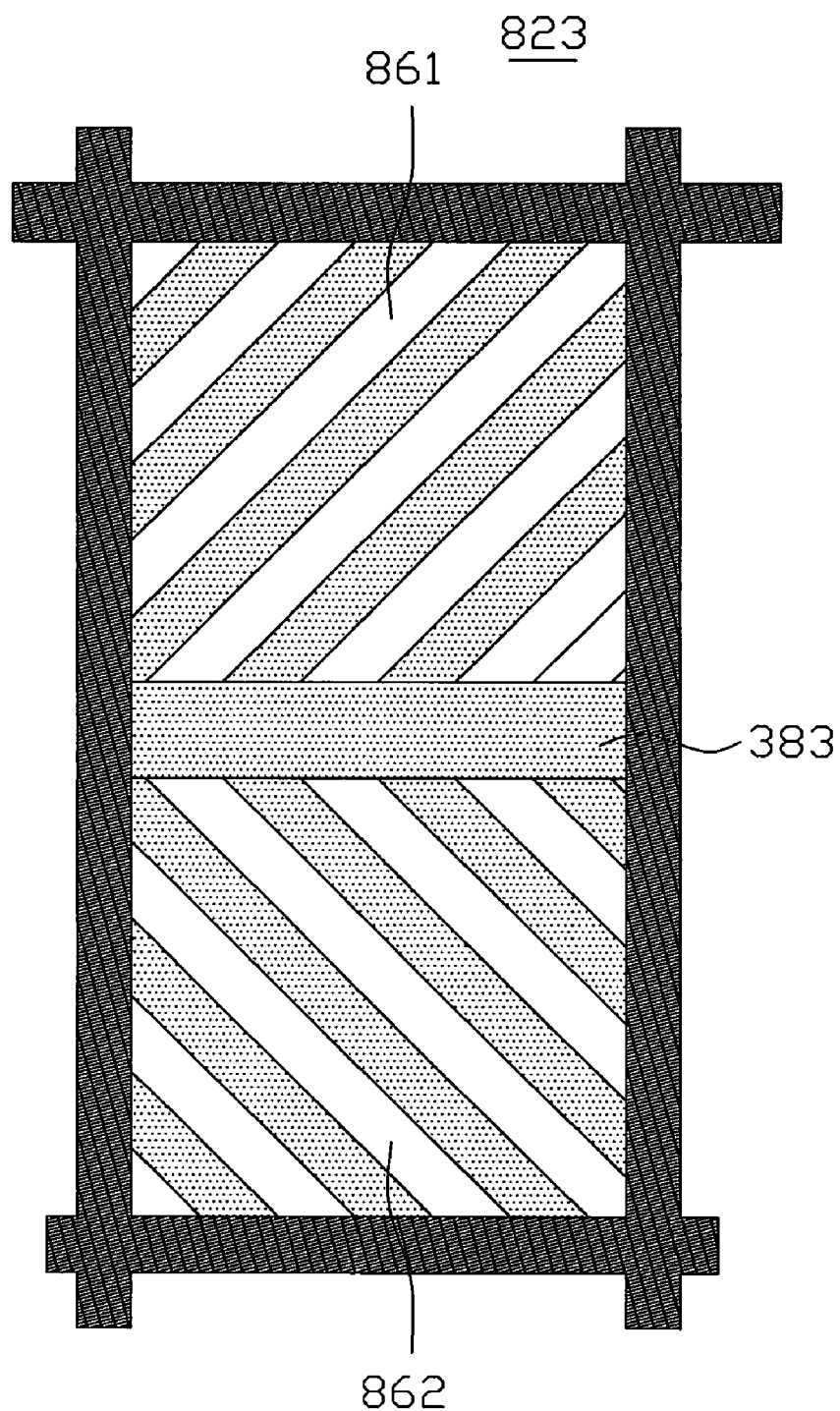
FIG. 6 shows a top view of a pixel area on the color filter substrate of a liquid crystal display according to an embodiment of the present invention.

FIG. 5 shows a top view of two adjacent pixel areas on the color filter substrate of a liquid crystal display according to an embodiment of the present invention. FIG. 6 shows a top view of a pixel area on the color filter substrate of a liquid crystal display according to an embodiment of the present invention. The two adjacent pixel areas 821 and 822 in FIG. 5 and the pixel area 823 in FIG. 6 are similar to the pixel area 20 in FIG. 4. The same members thereof are denoted by the same reference numerals and their detail explanation therefor is omitted. Referring to FIGS. 5 and 6, the pixel areas 821, 822 and 823 respectively include area 381, 382 and 383 which divides these pixel areas into an upper portion and a lower portion. The areas 381, 382 and 383 positionally correspond to a switch on the array substrate 14.

As shown in FIG. 5, the second transparent conductive layer 242 in the pixel areas 821 and 822 respectively define first holes 841 and 851 in the upper portion of the areas 381 and 382; and second holes 842 and 852 in the lower portion of the areas 381 and 382. The area of the second hole 842 (which is rectangle) is different from the area of the first hole 841 (which is circle). It is preferred that the pixel areas 821 and 822 are adjacent to each other, the area (or shape) of the first hole 841 in the pixel area 821 is similar to the area (or shape) of the second hole 852 in the pixel area 822, and the area (or shape) of the second hole 842 in the pixel area 821 is similar to the area (or shape) of the first hole 851 in the pixel area 822. In this arrangement, the holes having similar area (or being in similar shape) in the four parts of two adjacent pixel areas are alternately disposed in the longitudinal or latitudinal direction, so that uneven brightness problem may be prevented when the difference between transmittances of any two of the four parts is relatively large. As shown in FIG. 6, the upper and lower portions of the pixel area 823 respectively comprises a plurality of first holes 861 and second holes 862 which are in bar shape. The first holes 861 and second holes 862 respectively have longitudinal axes which are different from each other. It is preferred that the longitudinal axis of the first holes 861 is the mapping of that of the second holes 862. In this arrangement, uneven brightness problem may be prevented. Note that the pixel areas are divided into upper and lower portions in this embodiment, however the present invention is not limited thereto. In one embodiment, the pixel areas may not be divided into upper and lower portions.

Figure 7:
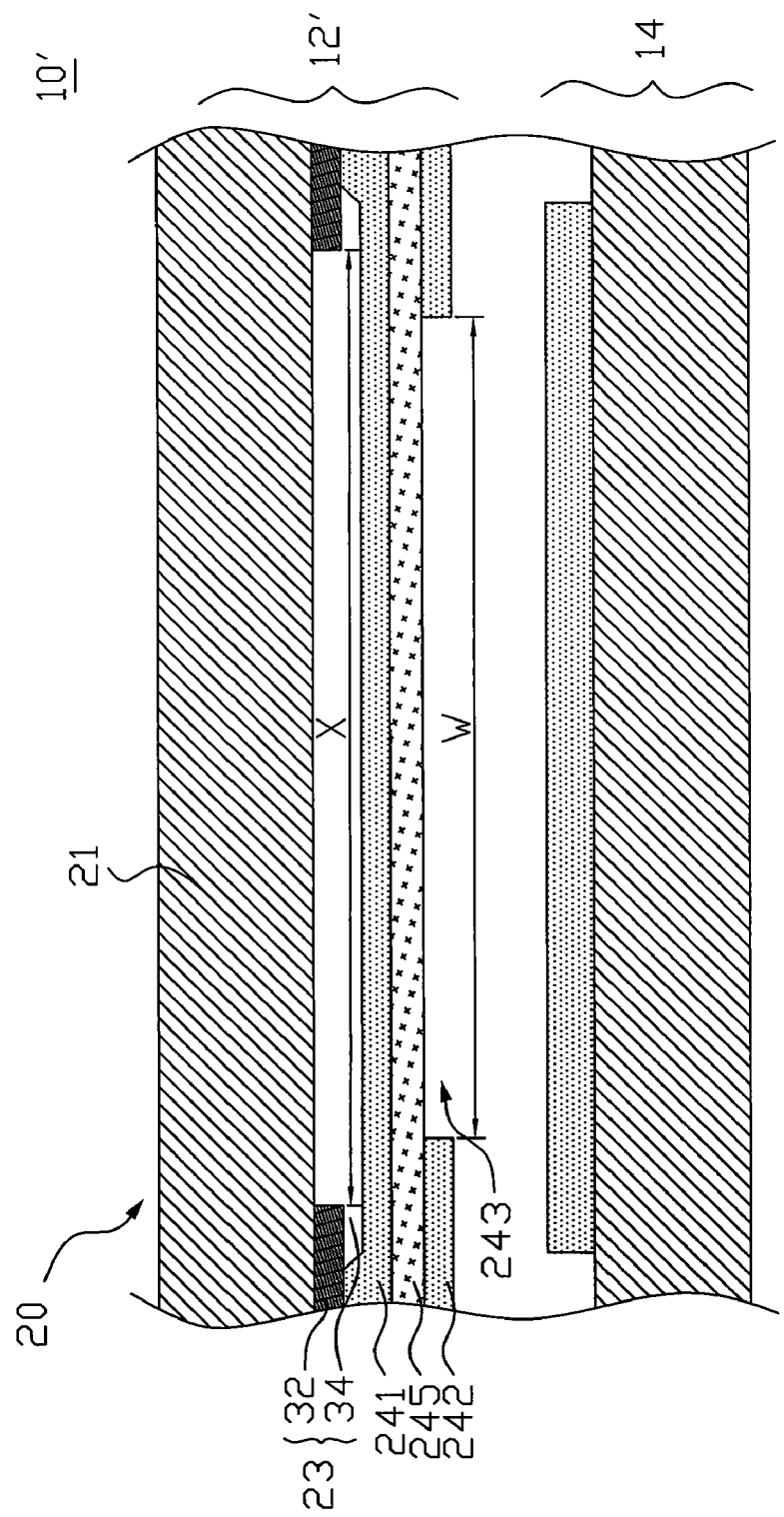
FIG. 7 partially shows a schematic cross-section of a liquid crystal display according to an embodiment of the present invention.

FIG. 7 partially shows a schematic cross-section of a liquid crystal display according to an embodiment of the present invention. The liquid crystal display 10' and the color filter substrate 12' in FIG. 7 are similar to the liquid crystal display 10 and the color filter substrate 12 in FIG. 2, and therefore the same numerical reference designates the same member and the descriptions of the same portion will be omitted. Only the portion that is different between the two liquid crystal displays and the two color filter substrates will be described in the followings. As shown in FIG. 7, the color filter substrate 12' of the liquid crystal display 10' is different from the color filter substrate 12 of the liquid crystal display 10. In the color filter substrate 12', the dielectric layer between the first transparent conductive layer 241 and the second transparent conductive layer 242 may be a transparent layer different form the color filter 23, and the color filter substrate 12' further comprises a color filter 23. Specifically, the color filter substrate 12' comprises a second transparent substrate 21, a first transparent conductive layer 241, a second transparent conductive layer 242, a dielectric layer 245 and a color filter 23. The first transparent conductive layer 241 is disposed between the second transparent substrate 21 and the second transparent conductive layer 242, and the dielectric layer 245 is disposed between the first transparent conductive layer 241 and the second transparent conductive layer 242. The color filter 23 is disposed between the first transparent conductive layer 241 and the second transparent substrate 21. A filter trace 34 of the color filter 23 positionally corresponds to a pixel area 20. In a preferred embodiment, the color filter 23 is formed on the second transparent substrate 21. The first transparent conductive layer 241 is formed on the color filter 23. The dielectric layer 245 is formed on the first transparent conductive layer 241. The second transparent conductive layer 242 is formed on the dielectric layer 245.

Figure 8:
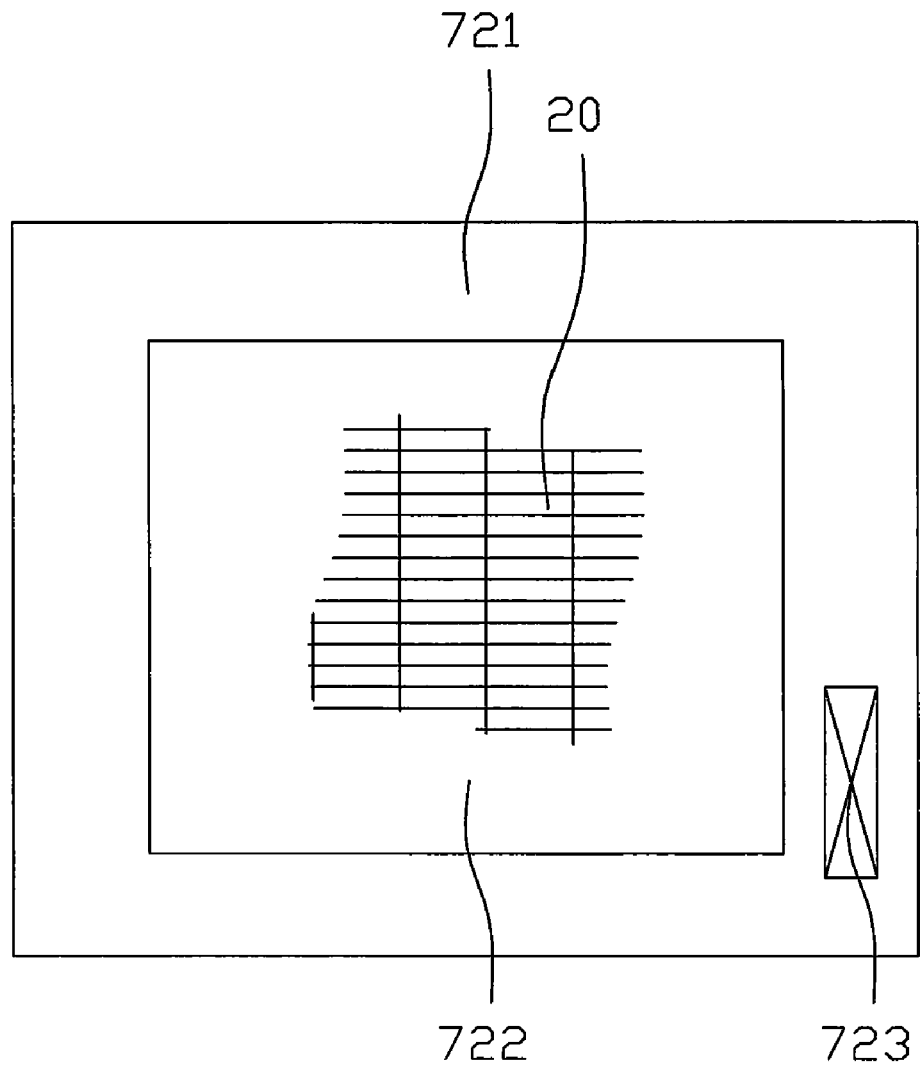
FIG. 8 shows a top view of the color filter substrate of a liquid crystal display according to an embodiment of the present invention.

FIG. 8 shows a top view of the color filter substrate of a liquid crystal display according to an embodiment of the present invention. The color filter substrate 712 in FIG. 8 is similar to the color filter substrate 12 in FIG. 2, and therefore the same numerical reference designates the same member of the color filter substrates and the descriptions of the same portion will be omitted. The color filter substrate 712 defines a display area 722 and a non-display area 721. The display area 722 comprises the pixel areas 20. The non-display area 721 positionally corresponds to the area that does not show image in the liquid crystal display 10. The non-display area 721 defines a via hole 723 which electrically connects between the first transparent conductive layer 241 and the second transparent conductive layer 242. The via hole 723 is disposed in the non-display area 721 so that the display quality of the liquid crystal display 10 is not impacted. According to this embodiment, the common voltage may be applied to only one of the first transparent conductive layer 241 and the second transparent conductive layer 242, and the other one of those can receive the common voltage through the via hole 723. As a result, a transparent conductive layer is additionally provided in this embodiment without increasing the number of TFT or IC, such that the portion between the pixel electrode 48 and the first and second portions of the pixel areas 20 may have two areas in which the liquid crystal molecules of the liquid crystal layer 16 are orientated to different directions. Compared with the conventional art, the aperture ratio of the color filter substrate 12 and the liquid crystal display 10 is relatively large and the cost thereof is relatively low. In addition, at least one of the color washout and the fingerprint mura may be reduced. In this embodiment, the non-display area 721 is disposed in the periphery of the color filter substrate 12 and surrounds the pixel areas 20.

Figure 9:
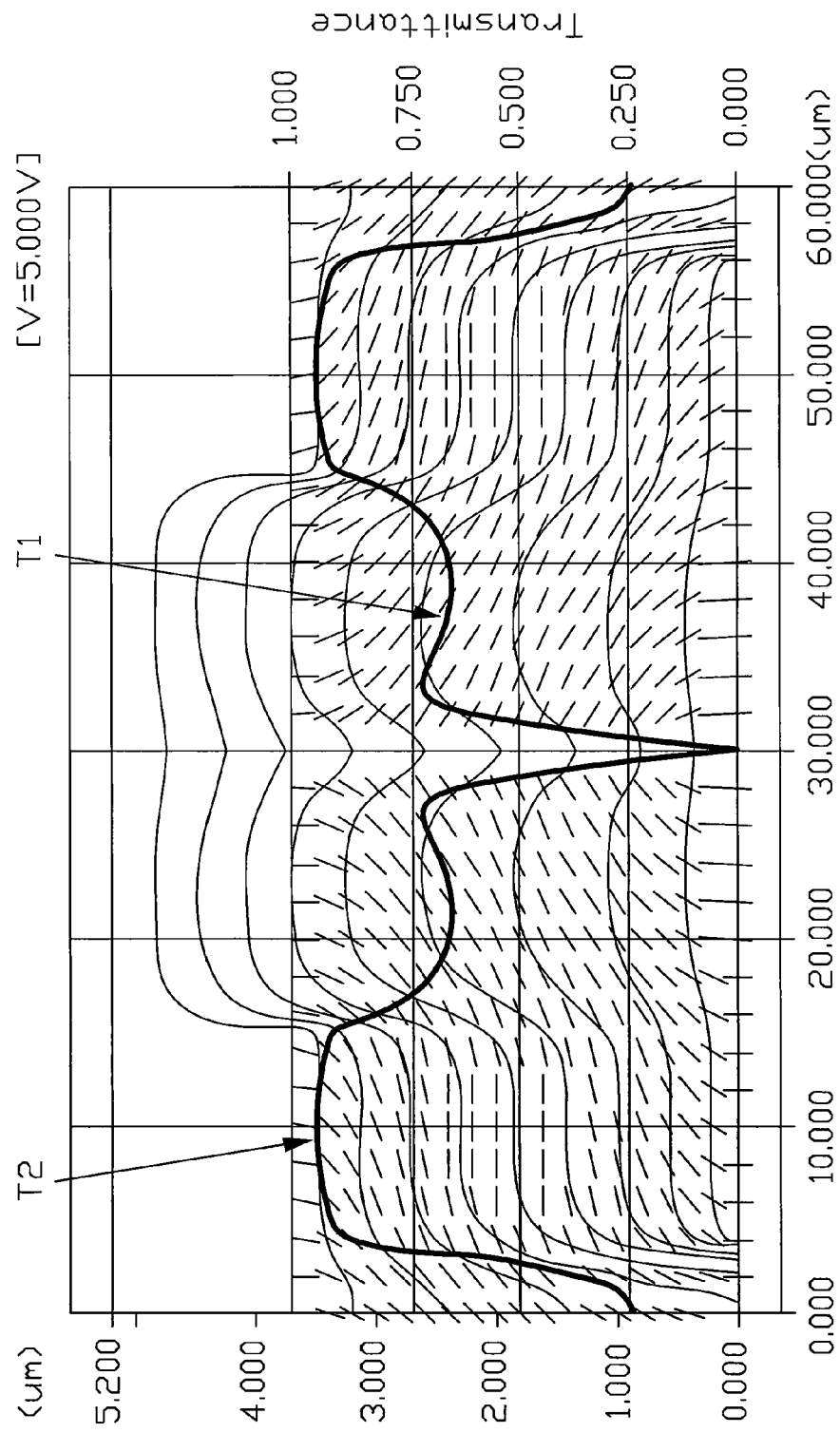
FIG. 9 shows an electric field vs. transmittance curve chart of cross-section of a pixel in a liquid crystal display according to an embodiment of the present invention.
Figure 10:
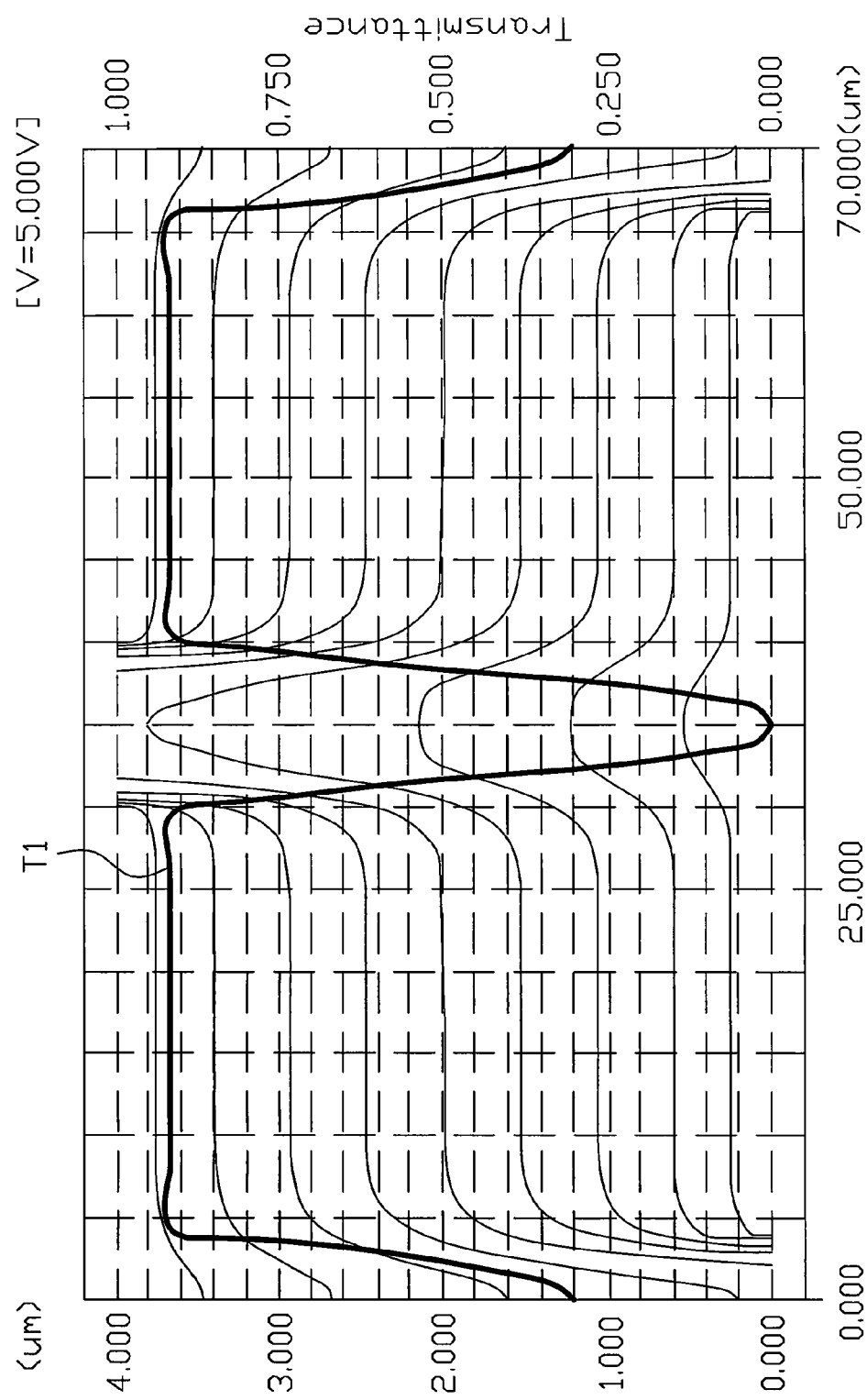
FIG. 10 shows an electric field vs. transmittance curve chart of cross-section of a pixel in a liquid crystal display according to the conventional art.

A simulation is performed on a pixel of the liquid crystal display 10 according to an embodiment of the present invention to obtain its electric field vs. transmittance curve, voltage vs. transmittance curve, and gray scale vs. transmittance curve (gamma curve). The curves of this embodiment are then compared to that of the conventional art. FIG. 9 shows an electric field vs. transmittance curve chart of cross-section of a pixel in a liquid crystal display according to an embodiment of the present invention. As shown in FIG. 2 and FIG. 4, the curve chart of FIG. 9 is obtained in the case that the hole 243 in the cross-section is a circle and the aperture ratio of cross-section of the pixel is 50%. The aperture ratio of cross-section used herein indicates the ratio of diameter W of the hole 243 to the width X of the filter trace 34. FIG. 10 shows an electric field vs. transmittance curve chart of cross-section of a pixel in a liquid crystal display according to the conventional art. Refer to FIG. 9 and FIG. 10. Compared to the conventional art, a pixel according to an embodiment of the present invention may have two different transmittances T1 and T2.

Figure 11A:
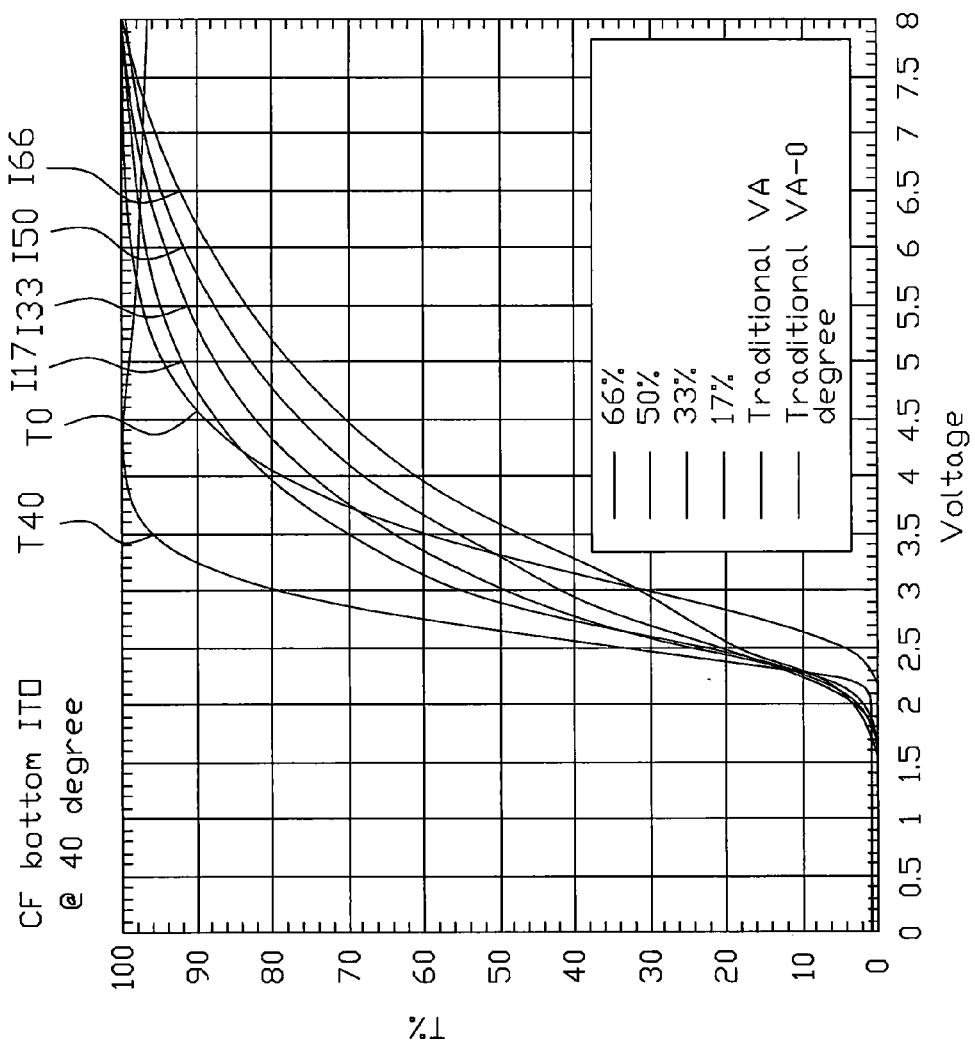
FIGS. 11A-11C show a voltage vs. transmittance curve (V-T curve) chart of cross-section of a pixel in a liquid crystal display according to an embodiment of the present invention.
Figure 11B:
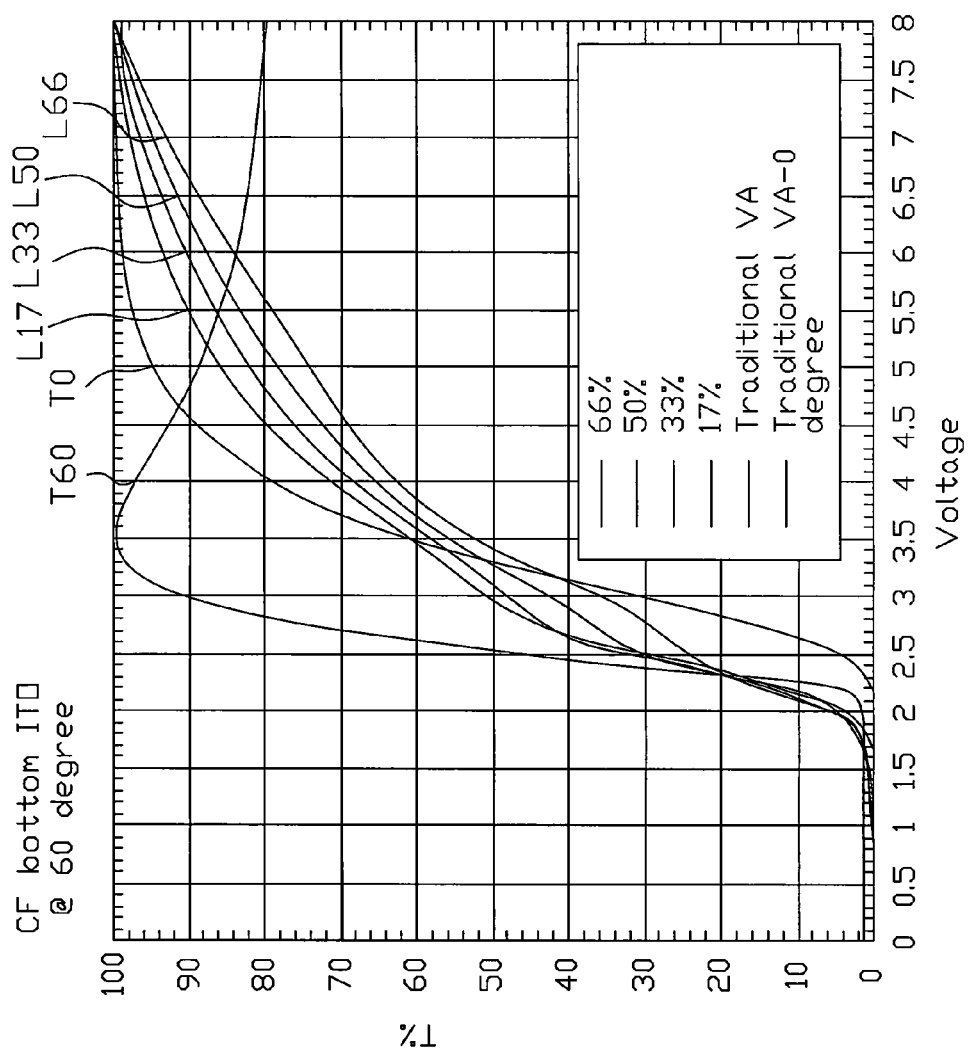
Figure 11C:
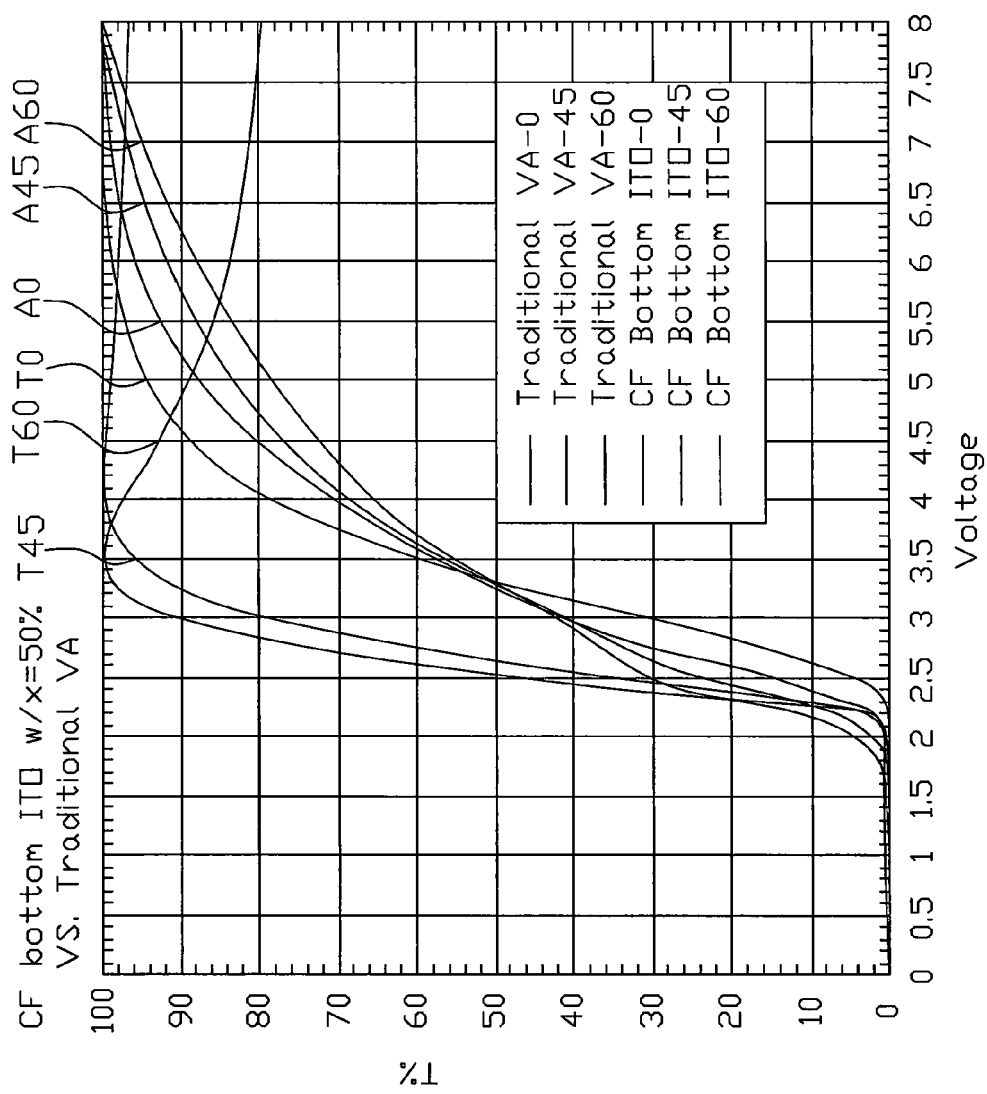

FIGS. 11A-11C show a voltage vs. transmittance curve (V-T curve) chart of cross-section of a pixel in a liquid crystal display according to an embodiment of the present invention. Specifically, referring to FIG. 11A, the curves I66, I50, I33, I17 are respectively obtained at a viewing angle of 40 degree in the case that the aperture ratios of cross-section according to the embodiment of FIG. 9 are 66%, 50%, 33%, 17%, respectively; the curves T40 and T0 are respectively obtained at viewing angles of 40 and 0 degree according to the conventional art. Referring to 1B, the curves L66, L50, L33, L17 are respectively obtained at a viewing angle of 60 degree in the case that the aperture ratios of cross-section according to the embodiment of FIG. 9 are 66%, 50%, 33%, 17%, respectively; the curves T60 and T0 are respectively obtained at a viewing angles of 60 and 0 degree according to the conventional art. Referring to FIG. 11C, the curves A0, A45 and A60 are respectively obtained at viewing angles of 0, 45 and 60 degree in the case that the aperture ratio of cross-section according to the embodiment of FIG. 9 is 50%; the curves T0, T45 and T60 are respectively obtained at viewing angles of 0, 45 and 60 degree according to the conventional art. As shown in FIGS. 11A~11C, each curve of the embodiment of the present invention is closer to the curve T0 of the conventional art at a viewing angle of 0 degree than other curves of the conventional art are. Accordingly, the color washout at large viewing angle may be reduced.

Figure 12:
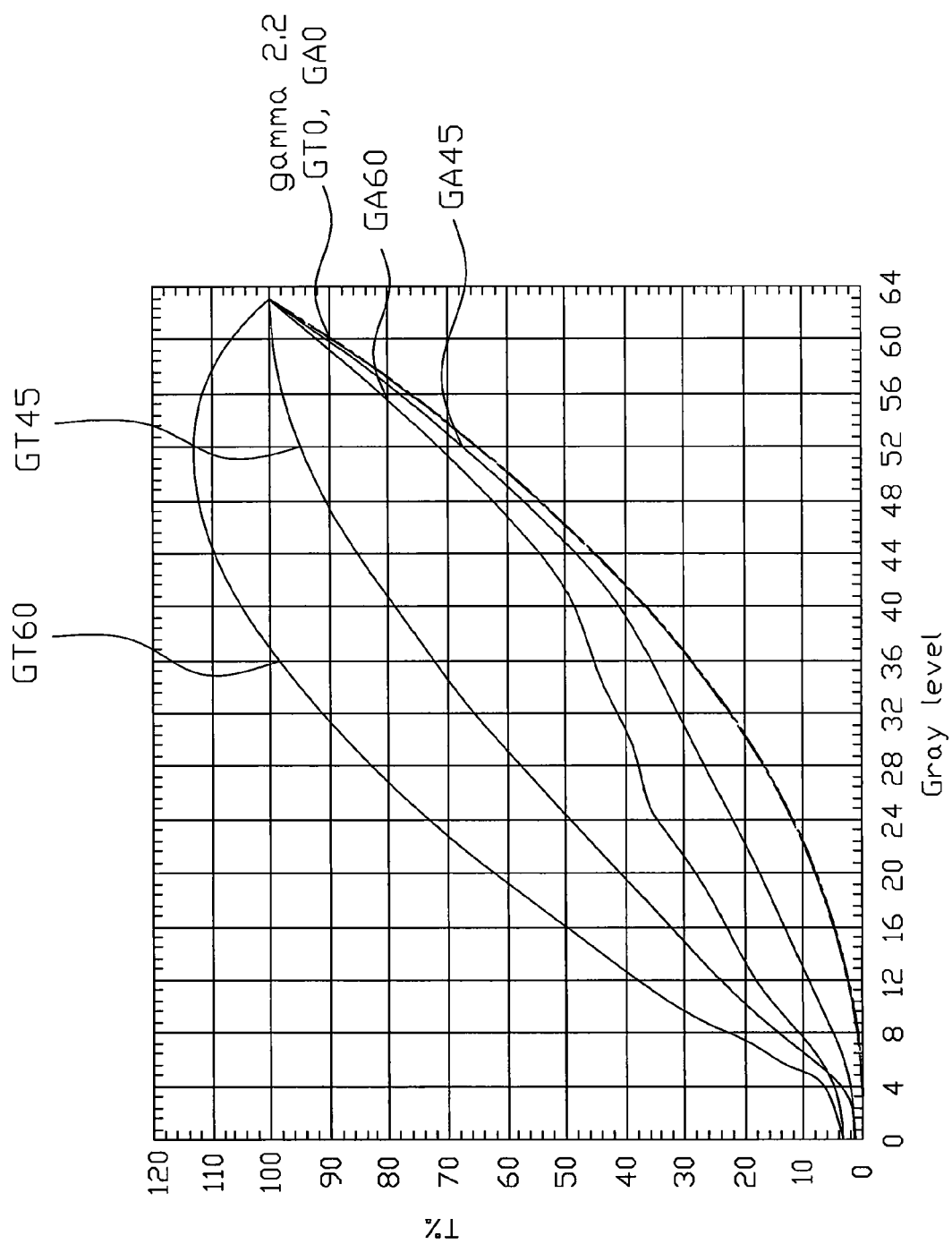
FIG. 12 shows a gray scale vs. transmittance curve (gamma curve) chart of a pixel in a liquid crystal display according to an embodiment of the present invention.

FIG. 12 shows a gray scale vs. transmittance curve (gamma curve) chart of a pixel in a liquid crystal display according to an embodiment of the present invention. Referring to 12, the curves GA0, GA45 and GA60 are respectively obtained at viewing angles of 0, 45 and 60 degree in the case that the aperture ratio of cross-section according to the embodiment of FIG. 9 is 50%; the curves GT0, GT45 and GT60 are respectively obtained at viewing angles of 0, 45 and 60 degree according to the conventional art. As shown in FIG. 12, each curve of the embodiment of the present invention is closer to the curve Gamma 2.2 and the curve T0 of the conventional art at a viewing angle of 0 degree than other curves of the conventional art are. Accordingly, the color washout at large viewing angle may be reduced. Note that the curves GA0, GT0 and Gamma 2.2 are approximately overlapped to each other. As has been said, the aperture ratio of cross-section according an embodiment of the present invention may be the ranges of 66%~50%, 50%~33%, or 33%~17%. In another embodiment, it may also be the range of 66%~17%.

Figures 13A, 13B:
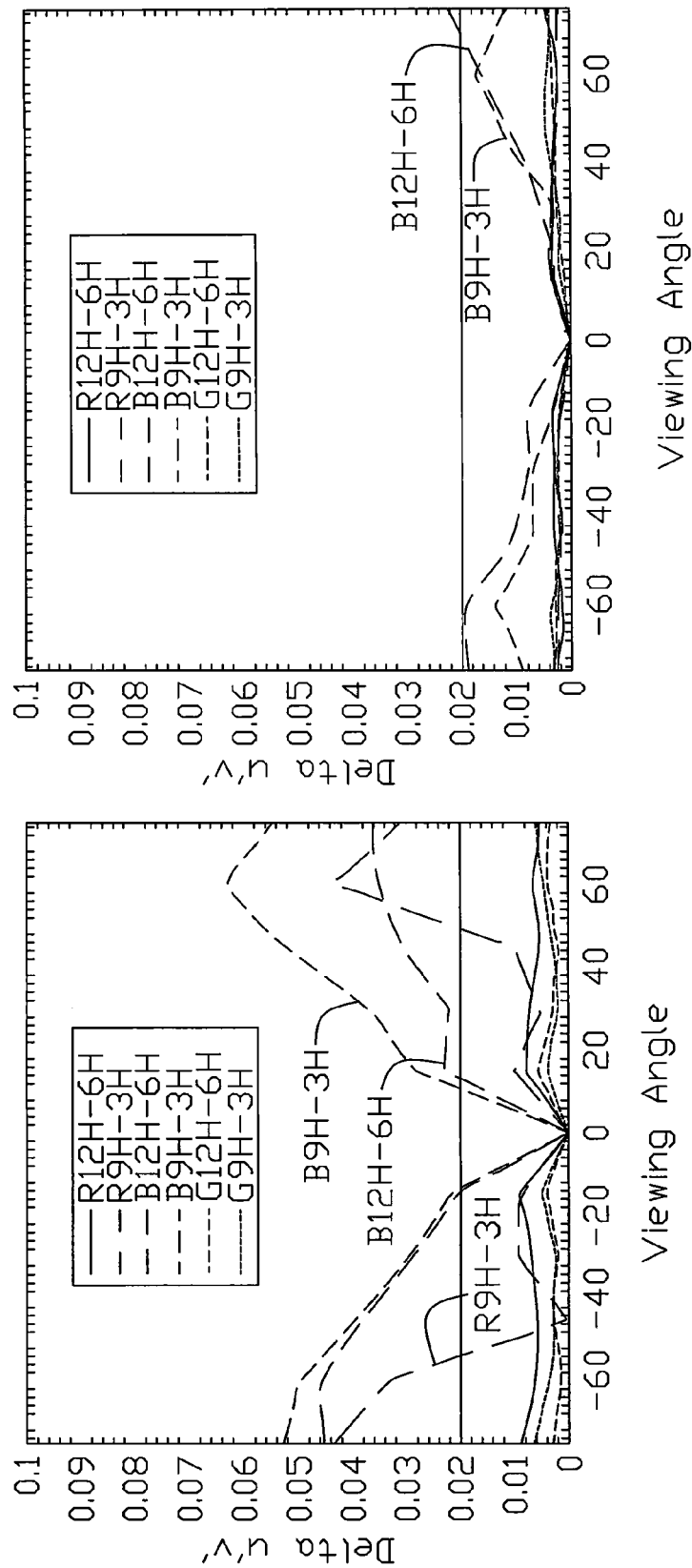
FIG. 13A shows a color difference (delate u'v') vs. viewing angle curve chart in straight direction of a liquid crystal display according to the conventional art.
FIG. 13B shows a color difference vs. viewing angle curve chart in straight direction of a liquid crystal display according to an embodiment of the present invention.

FIG. 13A shows a color difference (delate u'v') vs. viewing angle curve chart in straight direction of a liquid crystal display according to the conventional art. FIG. 13B shows a color difference vs. viewing angle curve chart in straight direction of a liquid crystal display according to an embodiment of the present invention (Note that the straight direction used therein indicates the direction at the azimuth angles of 180, 0, 90 or 270). Referring to the FIGS. 13A and 13B, the curves R12H-6H, B12H-6H and G12H-6H indicate the curves of red light, blue light and green light at azimuth angle of 0 or 180 degree; the curves R9H-3H, B9H-3H and G9H-3H indicate the curves of red light, blue light and green light at azimuth angle of 90 or 270 degree. When the color difference value (Delta u'v') is smaller than 0.02, it is hardly observed by human eye. Since the curves R12H-6H, G12H-6H and G9H-3H in FIG. 13A are below the color difference value of 0.02 and approximately overlapped to each other, the numeral references thereof are omitted for a clear purpose. In addition, since the curves R12H-6H, R9H-3H G12H-6H, and G9H-3H in FIG. 13B are below the color difference value of 0.02 and approximately overlapped to each other, the numeral references thereof are also omitted for a clear purpose.

As shown in FIG. 13A and FIG. 13B, the color difference value of curves of the conventional art is larger than that of the embodiment of the present invention. In the curves B12H-6H and B9H-3H of the blue light of the conventional liquid crystal display, most of their color difference value is larger than 0.02 at a large viewing angle. On the contrary, in the curves B12H-6H and B9H-3H of the blue light of the liquid crystal display according the embodiment of the present invention, most of their color difference value is smaller than 0.02 at a large viewing angle.

Figures 14A, 14B:
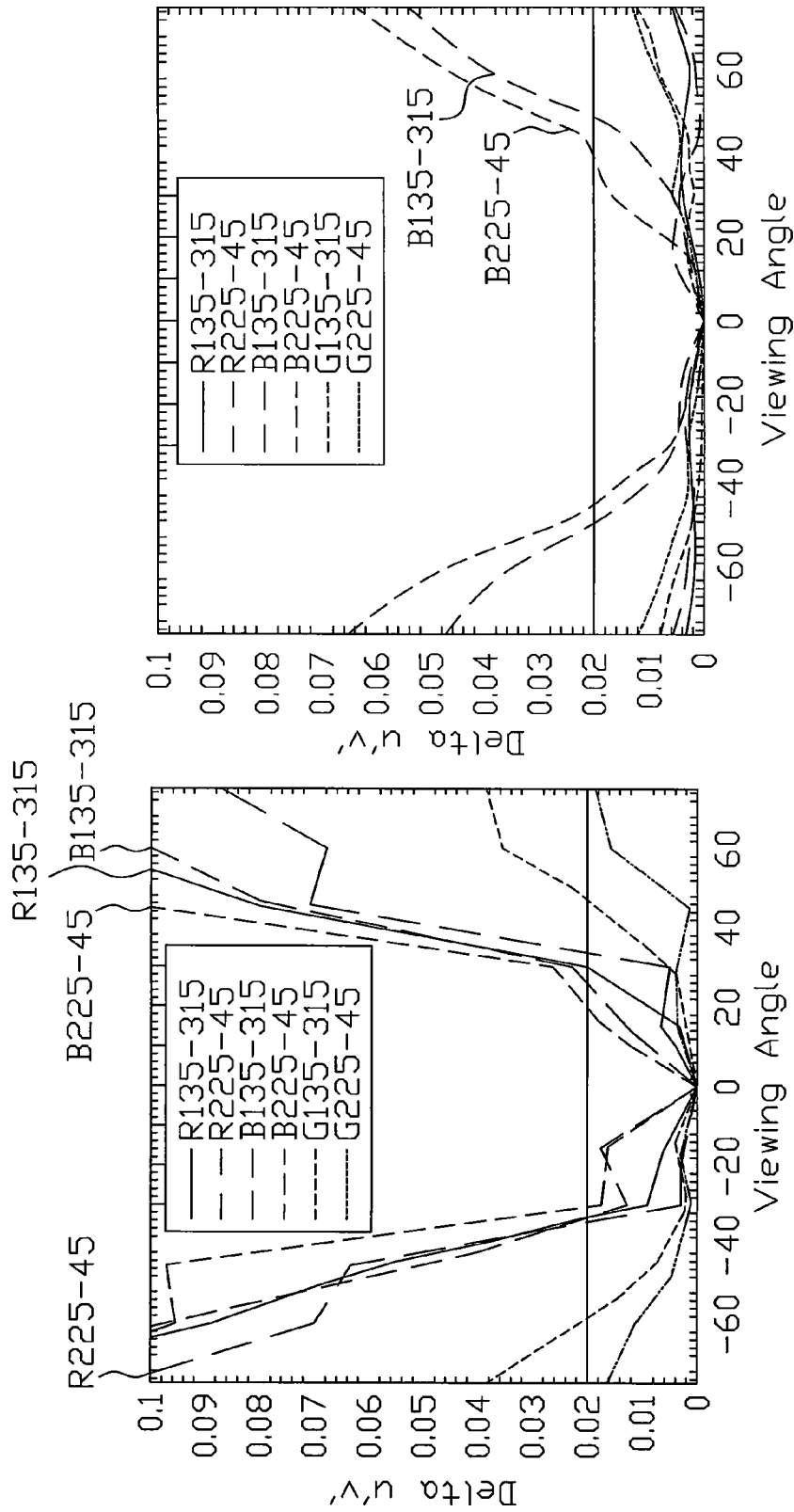
FIG. 14A shows a color difference vs. viewing angle curve chart at azimuth angle of 45 or 135 degree of a liquid crystal display according to the conventional art.
FIG. 14B shows a color difference vs. viewing angle curve chart at azimuth angle of 45 or 135 degree of a liquid crystal display according to an embodiment of the present invention.

FIG. 14A shows a color difference vs. viewing angle curve chart at azimuth angle of 45 or 135 degree of a liquid crystal display according to the conventional art. FIG. 14B shows a color difference vs. viewing angle curve chart at azimuth angle of 45 or 135 degree of a liquid crystal display according to an embodiment of the present invention. Referring to the FIGS. 14A and 14B, the curves R135-315, B135-315 and G135-315 indicate the curves of red light, blue light and green light at azimuth angle of 135 or 315 degree; the curves R225-45, B225-45 and G225-45 indicate the curves of red light, blue light and green light at azimuth angle of 225 or 45 degree. Since most of the curves G225-45 and G135-315 in FIG. 14A are below the color difference value of 0.02 and approximately overlapped to each other, the numeral references thereof are omitted for a clear purpose. In addition, since the curves G225-45, G135-315, R225-45 and R135-315 in FIG. 14B are below the color difference value of 0.02 and approximately overlapped to each other, the numeral references thereof are also omitted for a clear purpose.

As shown in FIG. 14A and FIG. 14B, the color difference value of curves of the conventional art is larger than that of curves of the embodiment of the present invention. In the curves of the blue light and red light of the conventional liquid crystal display, most of their color difference value at a large viewing angle is larger than 0.02. On the contrary, in the curves of the blue light of the liquid crystal display according the embodiment of the present invention, most of their color difference value at a large viewing angle is significantly reduced, and in the curves of the red light thereof, most of their color difference value at a large viewing angle is smaller than 0.02. Accordingly, it is proved that the liquid crystal display according the embodiment of the present invention can reduce the color washout.

Table 1 shows the relationship between viewing angle and contrast ratios of about 50 and 100 at different azimuth angles. As shown in table 1, according to the liquid crystal display of an embodiment of the present invention, the largest viewing angles at azimuth angles of 45, 135, 225 and 315 degree respectively are 35, 35, 35 and 36 degree when the contrast ratio is larger than 50. These largest viewing angles of this embodiment are respectively larger than those of the conventional art being 32, 29, 32 and 28. In addition, according to the liquid crystal display of an embodiment of the present invention, the largest viewing angles at azimuth angles of 180, 0, 90 and 270 degree respectively are 44, 52, 58 and 55 degree when the contrast ratio is larger than 100. These largest viewing angles of this embodiment are respectively larger than those of the conventional art being 32, 29, 32 and 28. To sum up, the liquid crystal display according to an embodiment of the present invention can achieve the function of increasing the viewing angle. Especially, the viewing angles at the azimuth angles of 180, 0, 90 and 270 are significantly increased.

TABLE 1

|  | Azimuth angle (degree) | The liquid crystal display according to an embodiment of the present invention | The liquid crystal display according to the conventional art |
|---|---|---|---|
| The contrast ratio is larger than 50 | 45 | 35 | 32 |
|  | 135 | 35 | 29 |
|  | 225 | 35 | 32 |
|  | 315 | 36 | 28 |
| The contrast ratio is larger than 100 | 180 | 44 | 38 |
|  | 0 | 52 | 39 |
|  | 90 | 58 | 39 |
|  | 270 | 55 | 40 |

Figure 15:
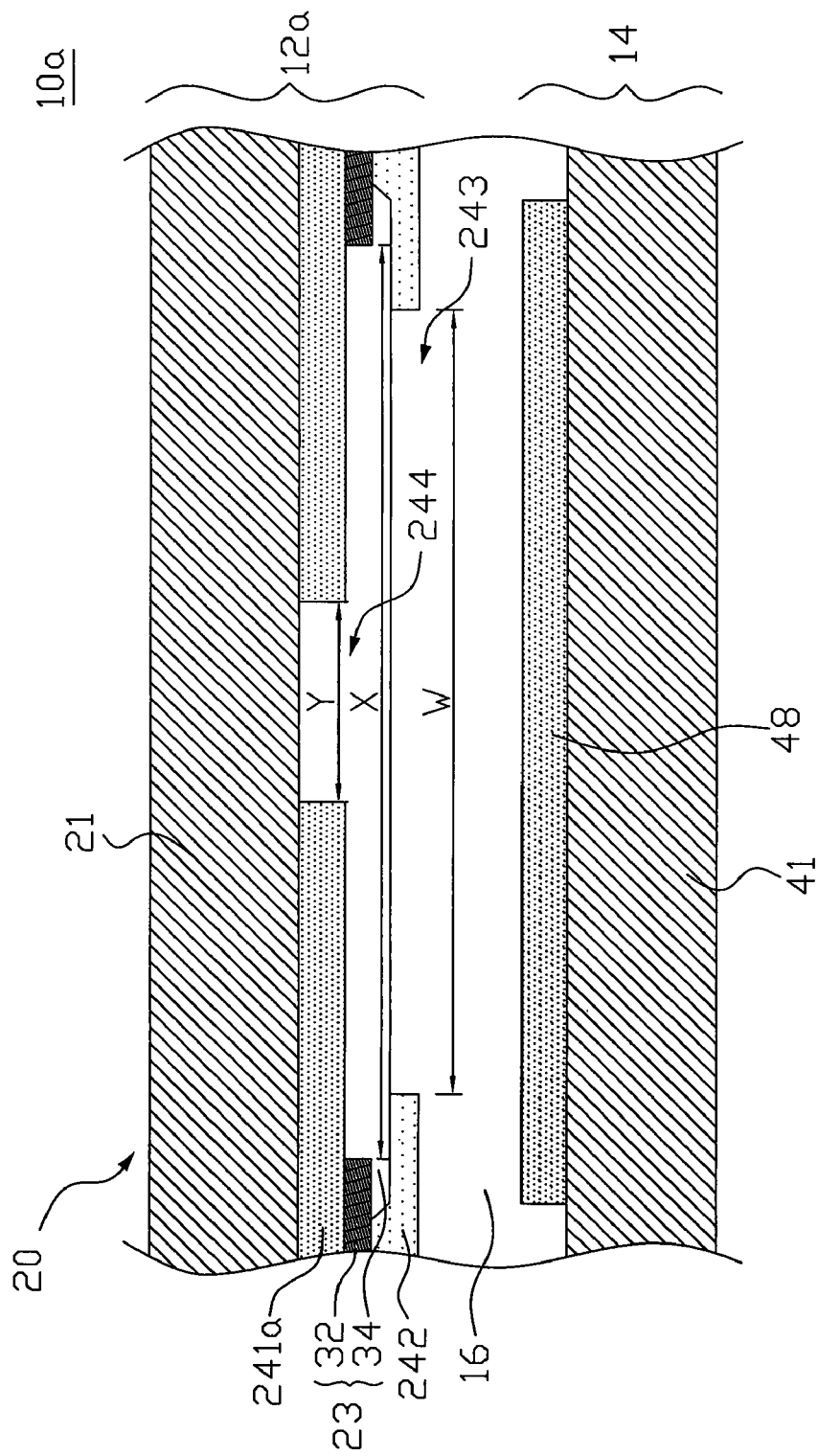
FIG. 15 partially shows a schematic cross-section of a liquid crystal display according to an embodiment of the present invention.

FIG. 15 partially shows a schematic cross-section of a liquid crystal display according to an embodiment of the present invention. The liquid crystal display 10a and the color filter substrate 12a in FIG. 15 are similar to the liquid crystal display 10 and the color filter substrate 12 in FIG. 2, and therefore the same numerical reference designates the same member in these liquid crystal displays and the color filter substrates and the descriptions of the same members will be omitted. Only the portion that is different between the two color filter substrates will be described in the followings. In this embodiment, the first transparent conductive layer 241a of the color filter substrate 12a further defines a hole 244 which has a diameter Y in the cross-section. It is preferred that the hole 244 positionally corresponds to the singular point in the electric field. When the inventors performed the experiment of fingerprint mura, it is found that the fingerprint mura at a voltage between 0V and 4V is significantly reduced in the liquid crystal display 10 according to the embodiment in FIG. 2. However, the reducing level of the fingerprint mura at a voltage between 4V and 5V is not significant compared to that at a voltage between 0V and 4V. On the contrary, the reducing level of the fingerprint mura at a voltage between 4V and 5V in the liquid crystal display 10a according to the embodiment in FIG. 15 is relatively significant compared to that in the liquid crystal display 10. As a result, the fingerprint mura is further reduced according to the embodiment in FIG. 15.

Figure 16:
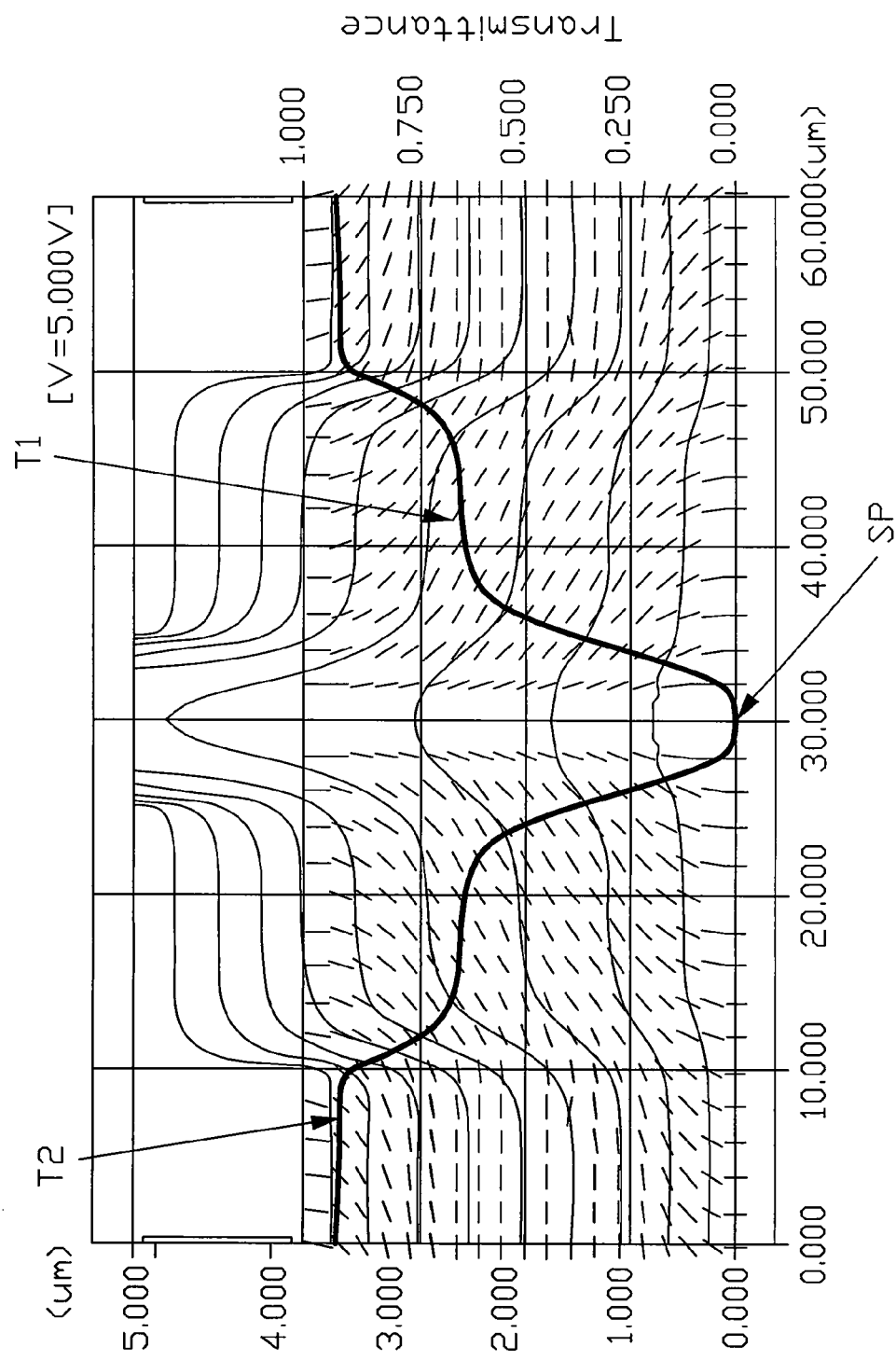
FIG. 16 shows an electric field vs. transmittance curve chart of cross-section of a pixel in a liquid crystal display according to the embodiment in FIG. 15.

FIG. 16 shows an electric field vs. transmittance curve chart of cross-section of a pixel in a liquid crystal display according to an embodiment in FIG. 15. The curves in FIG. 16 is obtained from the simulation where Y:W:X is equal to 10:40:60. The singular point area SP, where the electric field is zero, of the embodiment in FIG. 15 is wider than that of the embodiment in FIG. 9 in which Y is equal to zero. As a result, the singular point area SP is less likely to be shifted when a finger touches the liquid crystal display 10a. As a result, the fingerprint mura is further effectively reduced in this embodiment.

Figure 17A:
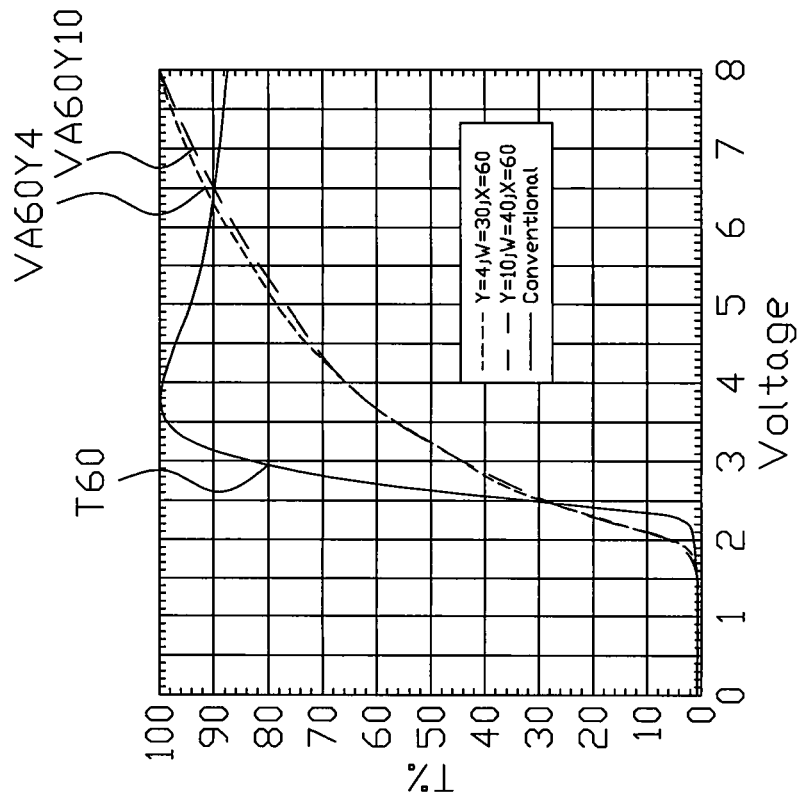
FIGS. 17A-17B show a V-T curve chart of cross-section of a pixel in a liquid crystal display according to an embodiment of the present invention.
Figure 17B:
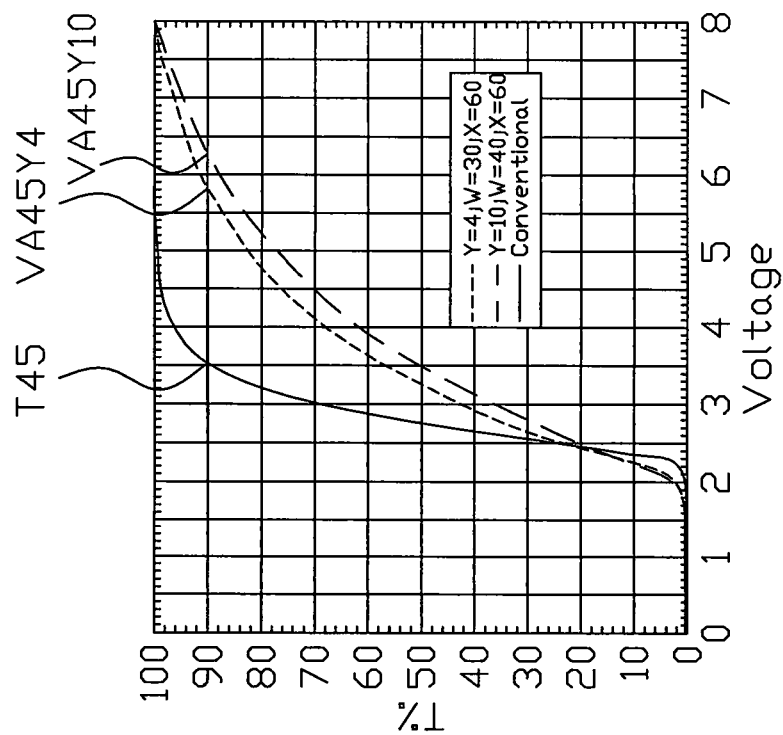

FIGS. 17A-17B show a V-T curve chart of cross-section of a pixel in a liquid crystal display according to an embodiment of the present invention. Specifically, referring to FIG. 17A, the curves VA45Y4 and VA45Y10 are respectively obtained according to the embodiment of FIG. 15 at a viewing angle of 45 degree in the case that the aperture ratios of cross-section Y:W:X are equal to 4:30:60 and 10:40:60; the curve T45 is obtained according to the conventional art at viewing angles of 45 degree. Referring to FIG. 17B, the curves VA60Y4 and VA60Y10 are respectively obtained according to the embodiment of FIG. 15 at a viewing angle of 60 degree in the case that the aperture ratios of cross-section Y:W:X are equal to 4:30:60 and 10:40:60; the curve T60 is obtained according to the conventional art at viewing angles of 60 degree.

As shown in FIGS. 17A and 17B, the curves T45 and T60 according to the conventional art have a gray-reversing phenomenon caused at a voltage of 3.5V, and the curves according to the embodiment of FIG. 15 do not have gray-reversing phenomenon, relatively. As a result, under the condition that the viewing angle is the same, the curves according to this embodiment are closer to the curve Gamma 2.2 than the curves according the conventional art are. Accordingly, the color washout is reduced at a large viewing angle in this embodiment.

In the liquid crystal display 10a according to this embodiment, the aperture ratios of cross-section Y:W:X can be adjusted on the basis of product design, so that it is relatively easy to reduce different degrees of fingerprint mura since the liquid crystal display 10a has an additional variance Y compared to the liquid crystal display 10. In addition, it is preferred that the shapes of the holes are symmetrical to each other since the shapes of the holes influence the distribution and symmetry of the electric field. The wilder the diameter of the hole 244 is, the smaller the transmittance area pixel areas 20 have. Consequently, when different products having different degrees of color washout and fingerprint mura are designed, variances, such as the aperture ratios of cross-section Y:W:X, the thickness of dielectric layer, and the shape of the holes, may be used and then optimized. In addition, the first transparent conductive layer 241 of the color filter substrate 12' in the liquid crystal display 10' may further define a hole. The effect of the hole is similar to the above-mentioned embodiment, and therefore the description thereof is omitted.

Although the preferred embodiments of the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A liquid crystal display, comprising:
   an array substrate comprising a first transparent substrate, a plurality of switches and a plurality of pixel electrodes, wherein the switches and the pixel electrodes are disposed on the first transparent substrate and each switch is electrically coupled to one of the pixel electrodes;
   a color filter substrate defining a plurality of pixel areas, each pixel area positionally corresponds to one of the pixel electrodes; and
   a liquid crystal layer disposed between the array substrate and the color filter substrate,
   wherein the color filter substrate comprises a second transparent substrate, a first transparent conductive layer, a second transparent conductive layer and a dielectric layer, the first transparent conductive layer is disposed between the second transparent substrate and the second transparent conductive layer, the dielectric layer is disposed between the first transparent conductive layer and the second transparent conductive layer, the dielectric layer is a color filter comprising a black matrix layer and a plurality of filter traces defined by the black matrix layer, each filter trace positionally corresponds to one of the pixel areas, and the second transparent conductive layer defines at least one hole in each pixel area;
   whereby at least two areas in which liquid crystal molecules of the liquid crystal layer are orientated to different directions are generated between the pixel area and the pixel electrode.

2. The liquid crystal display according to claim 1, wherein the first transparent conductive layer is disposed between the second transparent substrate and the color filter.

3. The liquid crystal display according to claim 2, wherein the at least one hole comprises a first hole and a second hole, and the area of the second hole is different from that of the first hole.

4. The liquid crystal display according to claim 3, wherein the area of the first hole in one of two adjacent pixel areas is equal to that of the second hole in the other of the two adjacent pixel areas, and the area of the second hole in the one of the two adjacent pixel areas is equal to that of the first hole in the other of the two adjacent pixel areas.

5. The liquid crystal display according to claim 1, wherein the color filter substrate further comprises a non-display area defining a via hole, and the first transparent conductive layer is electrically coupled to the second transparent conductive layer through the via hole.

6. The liquid crystal display according to claim 5, wherein the non-display area is disposed in the periphery of the color filter substrate and surrounds the pixel areas.

7. The liquid crystal display according to claim 1, wherein the switches are TFTs.

8. The liquid crystal display according to claim 1, wherein the first transparent conductive layer further defines another hole in each pixel area.

9. A liquid crystal display, comprising:
   an array substrate comprising a first transparent substrate, a plurality of switches and a plurality of pixel electrodes, wherein the switches and the pixel electrodes are disposed on the first transparent substrate and each switch is electrically coupled to one of the pixel electrodes;
   a color filter substrate defining a plurality of pixel areas, each pixel area positionally corresponds to one of the pixel electrodes; and
   a liquid crystal layer disposed between the array substrate and the color filter substrate,
   wherein the color filter substrate comprises a second transparent substrate, a first transparent conductive layer, a second transparent conductive layer, a dielectric layer and a color filter, the color filter comprises a black matrix layer and a plurality of filter traces defined by the black matrix layer, the first transparent conductive layer is disposed between the second transparent substrate and the second transparent conductive layer, the dielectric layer is disposed between the first transparent conductive layer and the second transparent conductive layer the color filter is disposed between the first transparent conductive layer and the second transparent substrate, and the second transparent conductive layer defines at least one hole in each pixel area;
   whereby at least two areas in which liquid crystal molecules of the liquid crystal layer are orientated to different directions are generated between the pixel area and the pixel electrode.

10. A color filter substrate defining a plurality of pixel areas, the color filter substrate comprising a transparent substrate, a first transparent conductive layer, a second transparent conductive layer and a dielectric layer,
    wherein the dielectric layer is a color filter comprising a black matrix layer and a plurality of filter traces defined by the black matrix layer, each filter trace positionally corresponds to one of the pixel areas, the first transparent conductive layer is disposed between the transparent substrate and the second transparent conductive layer, the dielectric layer is disposed between the first transparent conductive layer and the second transparent conductive layer, and the second transparent conductive layer defines at least one hole in each pixel area.

11. The color filter substrate according to claim 10, wherein the first transparent conductive layer is disposed between the transparent substrate and the color filter.

12. The color filter substrate according to claim 11, wherein the at least one hole comprises a first hole and a second hole, and the area of the second hole is different from that of the first hole.

13. The color filter substrate according to claim 12, wherein the area of the first hole in one of two adjacent pixel areas is equal to that of the second hole in the other of the two adjacent pixel areas, and the area of the second hole in the one of the two adjacent pixel areas is equal to that of the first hole in the other of the two adjacent pixel areas.

14. The color filter substrate according to claim 10 further comprises a non-display area defining a via hole, wherein the first transparent conductive layer is electrically coupled to the second transparent conductive layer through the via hole.

15. The color filter substrate according to claim 10, wherein the first transparent conductive layer further defines another hole in each pixel area.

16. A color filter substrate defining a plurality of pixel areas, the color filter substrate comprising a transparent substrate, a first transparent conductive layer, a second transparent conductive layer, a dielectric layer and a color filter, wherein the color filter comprises a black matrix layer and a plurality of filter traces defined by the black matrix layer, each filter trace positionally corresponds to one of the pixel areas, and the color filter is disposed between the first transparent conductive layer and the transparent substrate.

* * * * *